Aug. 13, 1935.                    J. P. SPANG                    2,011,204
              APPARATUS FOR AGING LIQUOR, WINE AND OTHER
                    BEVERAGES WHILE STORED IN A BARREL
                          Filed April 23, 1934
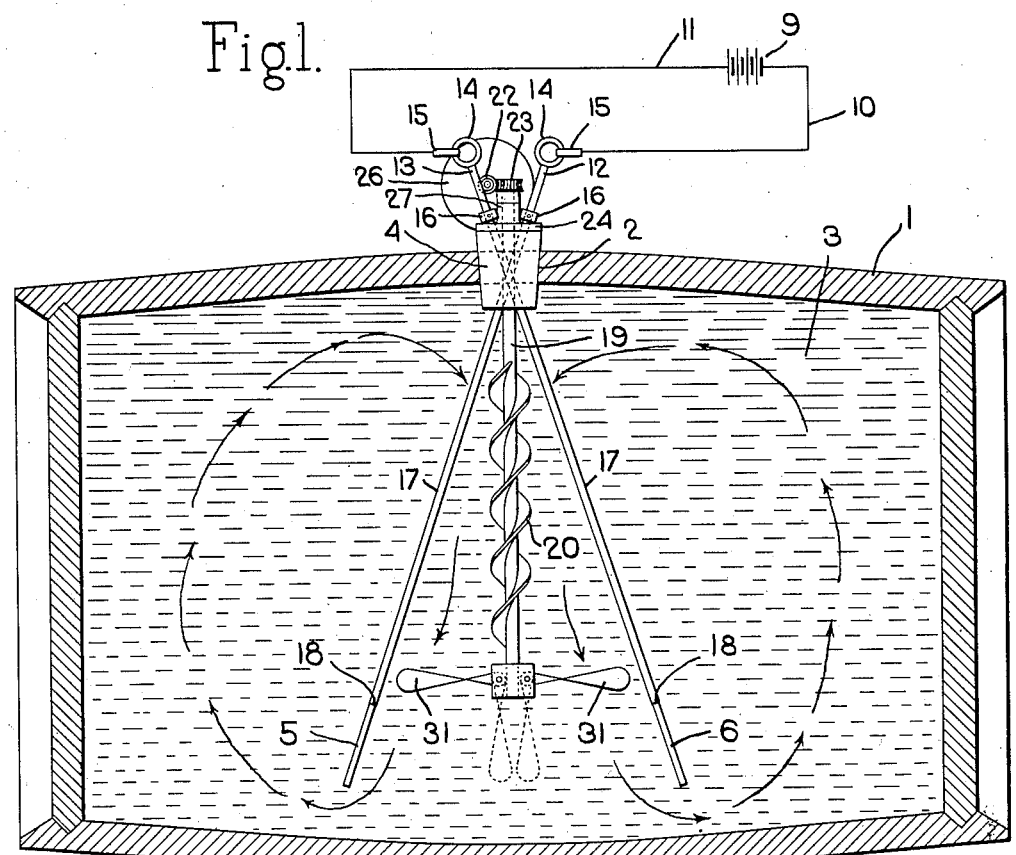
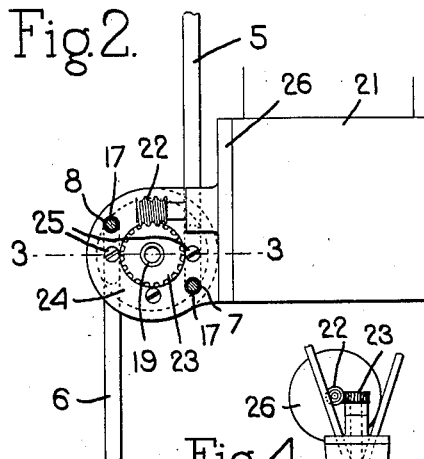
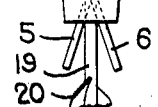
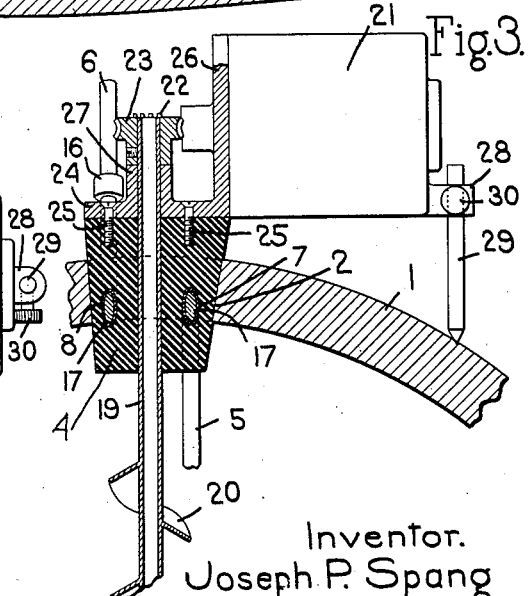
Inventor.
Joseph P. Spang
by Heard Smith & Tennant.
Attys.

Patented Aug. 13, 1935

2,011,204

UNITED STATES PATENT OFFICE 2,011,204

APPARATUS FOR AGING LIQUOR, WINE, AND OTHER BEVERAGES WHILE STORED IN A BARREL

Joseph P. Spang, Quincy, Mass.

Application April 23, 1934, Serial No. 721,907

1 Claim. (Cl. 204—26)

This invention relates to the aging of liquors, wines and other beverages by electrolysis action and has for its principal object to provide a novel apparatus by which spiritous or other beverages may be subjected to the desired electrolytic aging operation while they are contained in a barrel.

Another object of the invention is to provide an apparatus for aging spiritous and other beverages which comprises a plug adapted to fit into the bung-hole of a barrel and which carries electrodes that are constructed so that they may be introduced into the barrel through the bung-hole, whereby when the electrodes are connected to a source of electricity the liquid in the barrel will be subjected to the aging operation.

A further object of the invention is to provide an improved aging apparatus of this type in which the plug that is adapted to fit the bung-hole of the barrel is provided with means for causing a circulation of the liquid in the barrel so that all the liquid in the barrel will be uniformly subjected to the electrolytic action, such circulation-producing means being carried by the plug and insertable into the barrel through the bung-hole thereof.

In order to give an understanding of the invention I have illustrated in the drawing a selected embodiment thereof which will now be described after which the novel features will be pointed out in the appended claim.

Fig. 1 is a sectional view through a barrel showing my improved aging apparatus therein;

Fig. 2 is a top plan view of the device;

Fig. 3 is a section on the line 3—3, Fig. 2;

Fig. 4 is a view of the plug removed and showing the position of the electrodes when the plug is being inserted into the bung-hole.

In the drawing 1 indicates a barrel having the usual bung-hole 2 and which is adapted to contain the beverage 3 which it is desired to subject to the electrolytic process, whether such beverage be a spiritous beverage, such as whiskey or wine, or any other beverage.

My improved aging apparatus comprises a plug 4 adapted to fit the bung-hole 2 and a pair of electrodes 5, 6, carried by the plug and constructed so that said electrodes can be inserted through the bung-hole 2.

The plug 2 may conveniently be made of insulating material and it is shown as provided with two inclined openings 7, 8. Each electrode 5, 6 may conveniently be in the form of a rod or bar which extends through one of the openings 7, 8. The openings 7 and 8 incline in opposite directions so that when the electrodes are in operative position as shown in Fig. 1 the lower ends thereof are widely separated from each other.

These electrodes are adapted to be connected to a suitable source of electricity 9 by which a proper current, preferably a uni-directional current, may be impressed thereon.

As shown the upper ends 12, 13 of the electrodes 5, 6 project above the plug 4 and said projecting upper ends are connected to the source of electrical energy 9 through suitable wires 10, 11. The electrodes are shown as having looped upper ends 14 for convenience in manipulating them and the wires 10 and 11 may conveniently be provided with any suitable clips or attaching devices 15 by which the proper electrical connection to the upper ends of the electrodes can be made.

In order to insert the electrodes into the barrel each electrode is partially withdrawn from the plug as shown in Fig. 4 so that the lower ends only of the electrodes will project through the plug. With this arrangement the lower ends of the electrodes will be brought near enough together so that the plug with the electrodes carried thereby can be inserted through the bung-hole, and when the plug is seated in the bung-hole then the electrodes may be moved downwardly into their operative position as shown in Fig. 1. Each electrode has a collar 16 thereon which serves to limit the downward movement thereof.

As stated above the inclined relation of the electrodes is such that when they are in their operative position the lower ends, which are the active ends, are widely separated from each other.

I will preferably provide each electrode, except at its lower end, with an insulating envelope 17, the insulation extending to about the point 18. When the electrodes are in place and connected to the source of electrical energy 9 an electrolytic action will be set up in the liquid 3 which will produce the desired aging operation.

The electrolytic action, of course, will take place in the zone between the electrodes and in order to provide for subjecting all the liquid in the barrel to this electrolytic action I have provided a circulating device which is carried by the plug 4 and which causes a circulation of the liquid in the barrel through the operative zone or field.

The plug 4 is shown as having a shaft 19 journalled therein on which is formed a screw 20. As the shaft is rotated rapidly this screw will cause a downward circulation of the liquid in the direction of the shaft thereby causing the liquid to pass through the active zone between the electrodes 5 and 6. When this current of liquid reaches the bottom it will spread out in either direction toward the ends so that there will be a constant circulation of liquid in substantially the direction of the arrows.

The shaft 19 may be rotated in any appropriate way. As herein shown there is provided an electric motor 21, the shaft of which has a worm 22 thereon which meshes with a worm gear 23 on the upper end of the shaft 19. This motor is secured to the plug so that the plug and the motor form a portable unit. This may be provided for in various ways. As herein shown the plug has a plate 24 secured to the top thereof by screws 25 and this plate has integral with it an upstanding bracket 26 to which the motor 21 is secured. The plate 24 is shown as having a bearing 27 for the shaft 19.

In order to assist in supporting the motor the motor frame is formed with an ear 28 in which is adjustably mounted a post 29 that is adapted to rest on the barrel 1 as shown in Fig. 3. This post can be adjusted vertically and is retained in adjusted position by the set screw 30.

In order to increase the circulation of the liquid 3 the shaft 19 is shown as having propeller blades 31 connected to the lower end thereof. These blades are folding blades so that normally they fold down into the dotted line position and this is the position they assume when they are being inserted through the bung-hole.

The construction of the blades is such that as soon as the shaft 19 is rotated the resistance of the liquid against the blades causes them to swing into their operative horizontal position shown in full lines in Fig. 1, in which position they augment the action of the screw 20 in causing circulation of the liquid in the barrel.

The insulating coating 17 of the electrodes 1 will preferably extend to a point 18 below the lower end of the shaft 9, and if desired said blades 31 may be made of insulating material.

The shaft 19 is shown as hollow so that if it is desired to aerate the liquid 3 in the barrel this can be done by inserting an aerating tube through the hollow shaft 19 or by delivering the aerating gas through said shaft.

The means for circulating the liquid is also an element in giving a uniform color to the beverage in the barrel. Whiskey barrels are commonly charred on the inside and the charred surface serves to color the liquor. By causing a circulation of the liquor in the barrel an even or uniform coloring of the whiskey will result.

The device is simple and inexpensive to manufacture and is so constructed that both the electrodes and the means for causing circulation can be inserted into the barrel through the bung-hole. This invention thus provides an apparatus by which the beverage may be subjected to the electrolytic aging apparatus while in the barrel and without removing it therefrom.

I claim:

An apparatus for aging beverage in the barrel comprising a plug adapted to fit the bung-hole of the barrel, a pair of electrodes carried by the plug and adapted to be inserted into the barrel through the bung-hole, said electrodes being insulated except at the extremities and said non-insulated extremities being widely separated within the barrel, a shaft journalled in the plug and located between the electrodes, means to rotate the shaft, a spiral blade carried by the shaft and arranged to produce a downward circulation of the liquid in the barrel through the zone between the non-insulated extremities of the electrodes.

JOSEPH P. SPANG.